United States Patent [19]
Yoshida

[11] Patent Number: 4,569,079
[45] Date of Patent: Feb. 4, 1986

[54] IMAGE DATA MASKING APPARATUS

[75] Inventor: Hajime Yoshida, Chofu, Japan

[73] Assignee: Hajime Industries, Ltd., Tokyo, Japan

[21] Appl. No.: 471,715

[22] Filed: Mar. 3, 1983

[30] Foreign Application Priority Data

Mar. 11, 1982 [JP] Japan ................................. 57-38323

[51] Int. Cl.[4] ......................... H04N 5/22; G06K 9/00
[52] U.S. Cl. ........................................ 382/1; 358/160; 358/183; 382/48; 382/61
[58] Field of Search ................... 382/1, 41, 44, 45, 48, 382/61, 69; 358/22, 33, 165, 183, 160; 364/518

[56] References Cited

U.S. PATENT DOCUMENTS 4,101,930 7/1978 Sanders et al. ...................... 358/183
4,434,503 2/1984 Tanaka et al. ........................ 382/48

*Primary Examiner*—Leo H. Boudreau
*Attorney, Agent, or Firm*—Murray Schaffer

[57] ABSTRACT

The target screen of a television camera is divided into a matrix in horizontal and vertical directions to receive image data signals as divided in the matrix for subsequent processing. A memory circuit having the same number of memory elements as the divisions of the matrix, a circuit for scanning addresses of the memory elements of the memory circuit in synchronization with scanning in the television camera, a circuit for preliminarily memorizing signals, which are used to discriminate which of the image data signals are processed or not, on memory elements of the memory circuit with addresses corresponding to the image data signals respectively and a circuit for generating a control signal based on the memory data signal from the memory circuit to determine which image data signals is used or not in response to scanning of the target screen of the television camera is provided. A circuit for controlling supply of the image data signal from the television camera to the processing apparatus is also provided.

11 Claims, 10 Drawing Figures

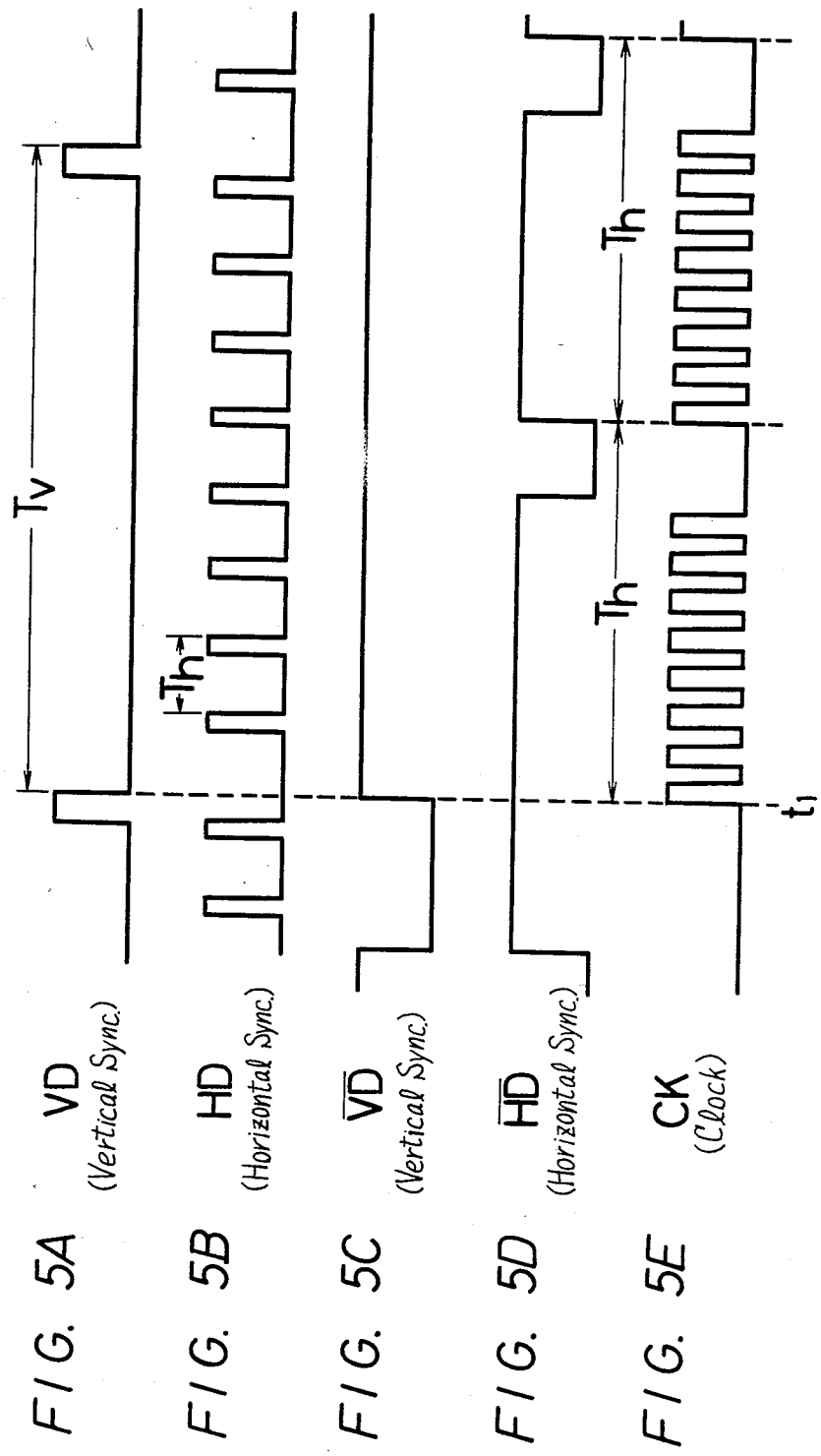

IMAGE DATA MASKING APPARATUS

BACKGROUND OF THE INVENTION

The present invention relates generally to an image data masking apparatus which employs a television camera to pick up an object or the like, and is directed more particularly to an image data masking apparatus by which an electronic masking is applied to the image of an object that is picked up by the television camera when the object is picked up by the television camera.

During recent years, various image processing systems or defect inspection systems utilizing television cameras have been proposed and gradually put into practice. Further, not only television cameras using a pick-up tube but also television cameras using a solid state image sensor are used. Sometimes, with the use of such television cameras, some portions of its pick-up screen, such as a target screen, need not be image processed, or only the image information from its desired portion are to be processed and datarized. On such occasions, if a computer (CPU) is used as the processing system, it may be possible through the application of its software or the like, to utilize the data of only the necessary sections of the screen. However, in such case, when the shape of the section that is desired to be datarized and then utilized or not desired for processing frequently changes, the complication arises that requires changes in the software program adapting the CPU for each case.

OBJECTS AND SUMMARY OF THE INVENTION

Accordingly, it is a main object of the present invention to provide an image data masking apparatus for use with an image data processing system which enables the simple electronic masking of the unnecessary portions of the target screen, of a television camera for example.

According to an aspect of the present invention, there is provided an image data masking apparatus for use with an image data processing apparatus in which an image data signal from a target screen of a television camera is divided in a matrix in horizontal and vertical directions and the image data signals, as divided in the matrix, are processed, which comprise:

a memory circuit having the same number of memory elements as that of the image data signals divided in the matrix;

scanning means for scanning addresses of said memory elements of said memory circuit in synchronization with scanning in said television camera;

means for preliminarily memorizing signals, which are used to discriminate between which of said image data signals are processed or not, on memory elements of the memory circuit with addresses corresponding to the image data signals respectively;

means for generating a control signal based on the memory data signal from the memory circuit to determine which image data signal is used or not in response to scanning of said target screen of said televison camera; and means for controlling the supply of the image data signal from the television camera to the processing apparatus based upon the control signal.

The additional, and other objects, features and advantages of the present invention will become apparent from the following description taken in conjunction with the accompanying drawings through which the like references designate the same elements and parts.

BRIEF DESCRIPTION OF THE DRAWINGS

FIGS. 5A to 5E are respectively waveform diagrams used to explain the operation of the present invention.

DESCRIPTION OF THE PREFERRED EMBODIMENTS

Prior to the explanations of the present invention, for the better understanding the same, two examples of the conventional image data processing apparatus which use a television camera will be explained in conjunction with FIG. 1 and FIG. 2, respectively.

Figure 1:
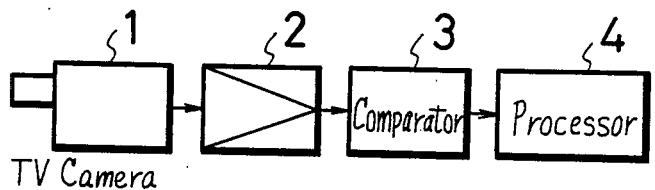
FIG. 1 is a block diagram showing a prior art image data processing apparatus using a television camera.

In the example shown in FIG. 1, the image information or data signal of an object (not shown on the drawing) from a television camera 1 is amplified by an amplifier 2, which output is supplied to a comparator 3, by which binary data signals such as white and black signals are obtained which are then fed to a processor 4 which, for instance, is a computer and wherein the signals are image-processed suitably, as required. On the other hand, in the prior art example shown in FIG. 2, the image data signal from the television camera 1 is passed as in FIG. 1 through an amplifier 2 to be amplified through an A/D converter. The analog signal from the amplifier is digitalized by A/D (analog-to-digital) converter 5, and the digital signal is supplied to and processed in the processor 4 such as a computer or the like similar to that shown in FIG. 1. With reference to FIG. 3, an example of the image data masking apparatus according to the present invention, is explained, for the case where it is applied to the image data processing apparatus as shown in FIG. 1 as an example.

Figure 4:
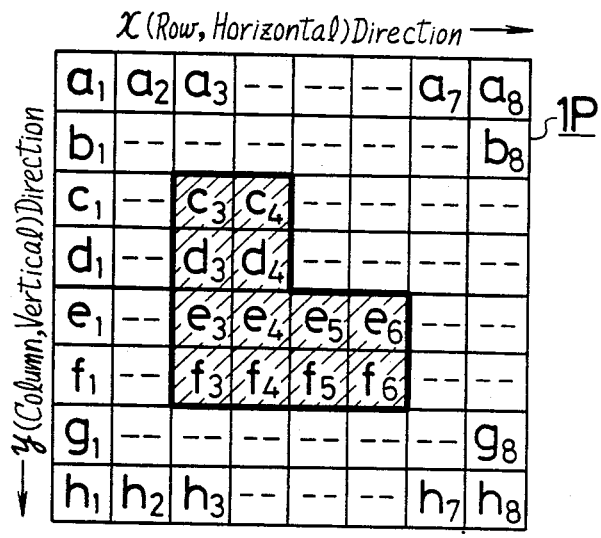
FIG. 4 is a plan view of an example of the image pick-up screen of the television camera which is used in the present invention.

FIG. 4 shows an example in accord with the present invention of a photoelectric conversion screen used in the television camera 1 forming its pick-up screen 1P. In this case, 64 picture sensor elements are arranged in an 8×8 matrix to form the target or image pick-up screen 1P.

First, the pick-up screen 1P of television camera 1 will be explained in reference with FIG. 4. In FIG. 4, the respective lines in the row or horizontal direction x of the pick-up screen are each formed of 8 sensor elements a1 ... a8, b1 ... b8, ... h1 ... h8, while the respective lines in the column or vertical direction y each consists of 8 sensor elements a1 ... h1, a2 ... h2, ..., a8 ... h8. The target screen 1P in practical use may contain a large number of sensor elements such as 300×200 as an example, but for explanation convenience, in the example on FIG. 4, the number illustrated is 8×8=64.

Now turning to FIG. 3, there is provided a television camera 1, amplifier 2, comparator 3 and processor 4 similar to those shown in FIG. 1, but with the important difference that an image information or data masking apparatus generally referred to by the numeral MA is inserted between the output of the comparator 3 and the input of the processor 4.

This image data masking apparatus MA includes an AND circuit 6, a memory circuit 7, a manual reverse switch 8, an inverter 9, horizontal and vertical synchronizing signal separation circuits 10 and 11, a first binary counter 12, a clock generator 13, a second binary counter 14, inverters 15, 16, an OR circuit 17 and a manual control switch 18.

The output of the comparator 3 is supplied to one input terminal of the AND circuit 6, which output is supplied to processor 4. To the other input terminal of the AND circuit 6, is connected the data output from the memory circuit 7, which contains memory elements, the number of which corresponds to that of the picture elements a1 ... h8. The output from the memory circuit is supplied directly via the reverse switch 8 or through inverter 9. For this memory circuit 7, read-/write memory is used as an example, but when the number of memory elements to memorized data is great, it is convenient to use a RAM (random access memory) or the like for the memory circuit 7, and therefore in the following explanations we shall assume that a RAM is used. In other words, the output of the memory circuit 7, is passed to the AND circuit 6 which is then operated so that the output signal from comparator 3 is controlled to either be fed or not to the processor 4. Therefore, the capacity of memory circuit 7, in other words, the number of its memory elements, becomes different depending upon the number of divisions of the target or picture screen 1P of the television camera 1. In the example of the present invention, as shown on FIG. 4, the target screen 1P is formed of $8 \times 8 = 64$ sensor elements arranged in a matrix form, and accordingly the capacity of memory circuit 7 will be sufficient with 64 bits. However, when the number of sensor elements in the target screen 1P is greater such as $300 \times 200$, the memory circuits 7 will necessitate a memory capacity over 60K bit.

In the television camera 1, scanning normally takes place following the sequence of sensor elements a1 ... a8, b1 ... b8, ..., h1 ... h8 of the target screen 1P as shown in FIG. 4. At such case, if image data signals only from a limited pattern area such as the sections hatched with a single line containing sensor elements c3, c4, d3, d4, e3, e4, e5, e6, f3, f4, f5, and f6 are desired to be processed then the other parts of the target screen 1P are masked out so that any image data signals therefrom are not fed to the processor 4.

According to the present invention, the above masking is carried out mainly by the function of the memory circuit 7, which will be explained hereunder in conjunction with FIG. 3. The image data signal (composite video signal) from the television camera 1 normally contains the image signal of the entire target screen 1P as well as horizontal and vertical synchronizing signals. Thus, the image data signal from television camera 1 is supplied to the comparator 3 through amplifier 2 while at the same time it is also fed to the horizontal synchronizing signal separation circuit 10 and vertical synchronizing signal separation circuit 11, where the horizontal and vertical synchronizing signals HD and VD are respectively separated or extracted from the image data signal.

Next, the separated horizontal synchronizing signal HD is applied to the clock input terminal of the first binary counter 12 and the output from the binary counter 12 is applied to the higher address input terminal among the address input terminals of memory circuit 7. On the other hand, the clock pulse signal that is the output of the clock generator 13 is fed to the clock input terminal of the second binary counter 14, and the binary output signal therefrom is applied to the lower address input terminal of memory circuit 7.

As the next step, reference is made to the waveform diagram of FIG. 5A to FIG. 5D. FIGS. 5A and 5B respectively show the vertical synchronizing signal VD as well as horizontal synchronizing signal HD from the vertical as well as horizontal synchronizing signal separation circuit 11 and 10 respectively. FIGS. 5A and 5B is based on the example of a target screen 1P which is formed of a relatively small number of sensor elements such as $8 \times 8 = 64$ as in FIG. 4, but is correspondingly illustrative of the case where a larger number of sensor elements are used.

Normally, the horizontal synchronizing signal HD is outputted when one horizontal scan of the target screen 1P is completed, whereas the vertical synchronizing signal VD is outputted when all scans of one target screen 1P are completed, so that the following explanations will be made under such same concept.

In the illustrative example where the target screen or sensor element matrix 11P formed of $8 \times 8 = 64$ sensor elements 8 horizontal synchronizing signals are outputted during the time period TV between the consecutive vertical synchronizing signals VD. Therefore, when the horizontal synchronizing signal HD from the horizontal synchronizing signal separation circuit 10 is supplied to the binary counter 12 at its clock input terminal and output binary counter 12 at its clock input terminal and output binary signal from the latter is fed to the higher address terminal of the memory circuit 7, the respective addresses in memory circuit 7 appointed thereby designate sensor elements a1 ... a8, b1 ... b8, ..., h1 ... h8 on the column direction or vertical direction y in the sensor element matrix 1P shown in FIG. 4.

As the next step, the lower address of memory circuit 7 is determined, which address designates the row direction or horizontal direction x of sensor elements in the sensor element matrix 1P of FIG. 4. The clock generator 13, which supplies the clock signal to the binary counter 14, the appoints the lower addresses of memory circuit 7, has an oscillation period preset so as to generate 8 pulses within one period Th of the horizontal synchronizing signal HD. (see FIGS. 5D and 5E) In order to attain accurate clock generation, it may be proper to use a crystal generator as the generator 13. Otherwise, although not illustrated on the drawings, if clock signals are outputted from the television camera 1, such signals may also be used. Now, the vertical synchronizing signal VD is supplied to an inverter 15 to invert the polarity thereof forming a signal $\overline{VD}$ as shown on FIG. 5C, which is then supplied through the OR gate 17 to the enable terminal of the clock generator 13. Accordingly, as shown in FIG. 5C, when the reversed vertical synchronizing signal $\overline{VD}$ rises to positive, which is the time point t1, the clock generator 13 starts to generate the clock pulse CK as shown in FIG. 5E. Thus, as aforementioned, 8 clock pulses CK are generated during each period Th of the horizontal synchronizing signal HD. It is noted that while the time point t1 is the same on FIGS. 5A through 5E, in order to clarify the relation between the respective signals, the time base is expanded on FIGS. 5C to 5E as compared to that of FIGS. 5A and 5B. Further, the horizontal synchronizing signal $\overline{HD}$, is, as shown on FIG. 5D, polarity-reversed by being fed to the inverter 16 and then supplied to the other input terminal of the OR gate 17, so as to form a part of the enable signal to the clock generator. Therefore, the clock generator 13 is also controlled by the horizontal synchronizing signal to thereby generate 8 clock pulses CK always and accurately during the period Th of the horizontal synchronizing signal.

The clock pulse CK is supplied to the clock input terminal of the second counter 14, which output binary signal is supplied to the lower address input terminal of memory circuit 7 to thereby designate the lower addresses thereof. This means that the addresses of the 8 sensor elements in line direction or horizontal direction x on the sensor element matrix or target screen 1P as shown on FIG. 14, are designated in memory circuit 7.

Thus, in response (synchronism) with the scan of the television camera 1, the addresses of the memory elements in the memory circuit 7 are practically scanned.

Further, the first counter 12 which designates the higher addresses of memory circuit 7, is cleared at every scan completion of the entire target screen 1P because the inverse vertical synchronizing signal $\overline{VD}$ as provided by the inverter 15 is supplied to its clear input terminal. On the other hand, the counter 14 which designates the lower addresses of memory circuit 7, is cleared at every one horizontal scan of the target screen 1P since the reverse horizontal synchronizing signal $\overline{HD}$ provided the inverter 16 is applied to its clear input terminal.

In the above example of the present invention, the division of target screen 1P in the vertical and horizontal direction is set as $8\times 8=64$, so that an address bus of 3 bits for the higher addresses as well as 3 bits for the lower addresses which total is 6 bits at the memory circuit 7 will suffice.

Turning to the memory circuit 7, the control switch 18 (FIG. 3) is a manually operated control switch connected to a source of current controlling the read and write functions of memory circuit 7,. When control switch 18 is connected to the positive side 18P, it is arranged for read mode and when the control switch 18 is connected to the ground side 18G, it is arranged for write mode, respectively. Let's assume that the control switch 18 is connected to the side 18G which is the read side. As shown in FIG. 3 the binary data signal from comparator 3 is supplied to the data input terminal of memory circuit 7, so that the binary signals (low or high) from comparator 3 in response to the scan of the target screen 1P in the television camera 1 are supplied to respective memory elements of the memory circuit 7 and then memorized thereon.

Now, it is assumed that among the $8\times 8=64$ sensor or picture elements on the target screen 1P, the picture elements c3, c4, ... f5 and f6 of the small pattern with single hatch lines in FIG. 4 are taken as black while the other picture elements as white. When this target screen 1P of the television camera 1 is scanned, comparator 3 outputs such image data signals in which the signals from the above mentioned picture elements c3, c4 ... f5 and f6 in the hatched portion are low, while the same for the remaining picture elements are high. Thus derived image data signals are then supplied to the data input terminal of the memory circuit 7. At this time, as above mentioned, the control input terminal 18 of the memory circuit 7 is switched to the write side 18G of the control switch 18 so that at the respective memory elements of memory circuit 7 with the addresses corresponding to the picture elements on the target screen 1P that is divided into $8\times 8=64$, the high or low data from the comparator 3 are respectively memorized. As the next step, the control switch 18 is switched to contact 18P so that the manually operated reverse switch 8, which is connected to the data output terminal of the memory circuit 7, is connected to the inverter 9. The output signal (data) from memory circuit 7 is thus supplied as a reverse signal to the other input terminal of the AND circuit 6. Under such condition, if the television camera 1 starts its pick up operation and the picture elements c3, c4 ... f5 and f6 of the target screen 1P are scanned, the high signals are supplied to one input terminal of the AND circuit 6 from the comparator 3. Thus, only the output signals that correspond to the image data of the picture elements c3, c4 ... f5 and f6 (with the single hatch lines) from the comparator 3 are supplied to the processor 4 via the AND circuit 6. In other words, the image data signals from the picture elements of other sections than that of the picture elements within the hatch line group are masked, which means that such data signals are not transferred to the processor 4.

So long as the above masking pattern is constructed in the memory circuit 7 and its control input terminal is connected with the read side 18P of the control switch 18, even though there are changes (low or high) in each data within the small pattern or picture elements c3, c4 ... f5 and f6, only such data signals (data) from the picture elements within the small pattern will be supplied to the processor 4.

In contrast to the above case, when only the small pattern section or picture elements c3, c4 ... f5 and f6 are desired to be masked, it is sufficient that the reverse switch 8 is connected to the side 8I so that the inverter 9 is not passed, and the data output from the memory circuit 7 is directly supplied to the other input terminal of the AND circuit 6. That is, since the low data are respectively memorized in the memory elements at the addresses of the memory circuit 7, which correspond to the small pattern or picture elements c3, c4 ... f5 and f6 in the target screen 1P, the other input of the AND circuit 6 is low when the small pattern of picture elements c3, c4 ... f5 and f6 on the target screen 1P in television camera 1 are scanned. Thus, the passage of output signal from comparator 3 through the AND circuit 6 to processor 4 is stopped from performing the masking. Only when the other picture elements are scanned the output signal from the comparator 3 transferred to the processor 4.

To initially set the system for masking, it is enough that a pattern of white and black (paper may be used) be preliminarily picked up by the television camera 1. By throwing the control switch 18 to the write side 18G the picked up mask pattern is constructed within the memory circuit 7 based upon the output from the comparator 3. Further, it may also be possible to make a mask pattern by using the actual objects (products or the like) to be picked up.

As such, according to the present invention, it is very easy to form the desired masking pattern and also to change the same as desired, so that superior effects can be presented.

Figure 2:
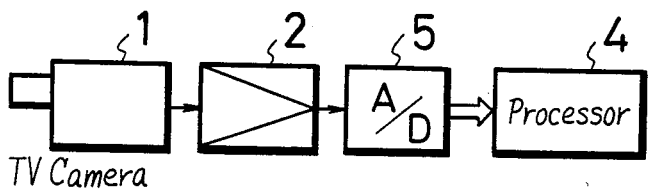
FIG. 2 is a block diagram showing another prior art image data processing apparatus using a television camera.
Figure 6:
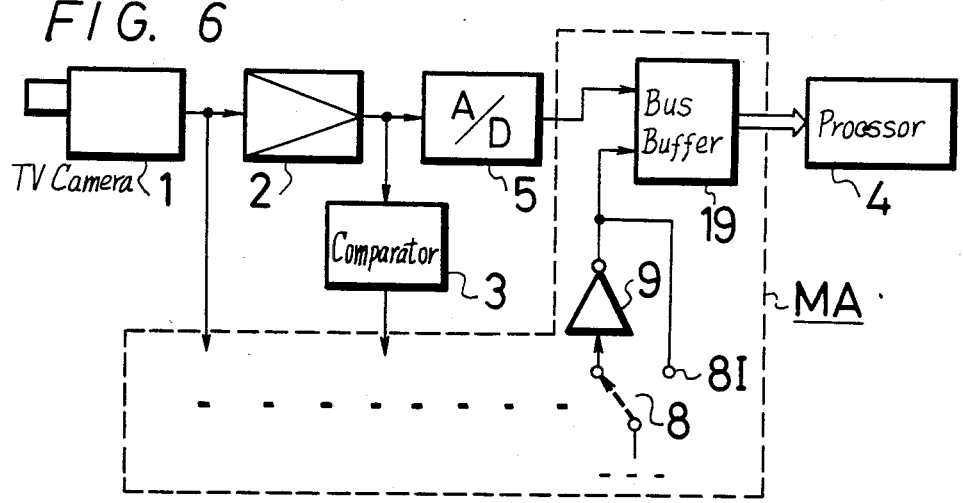
FIG. 6 is a block diagram showing another example of the present invention.
Figure 3:
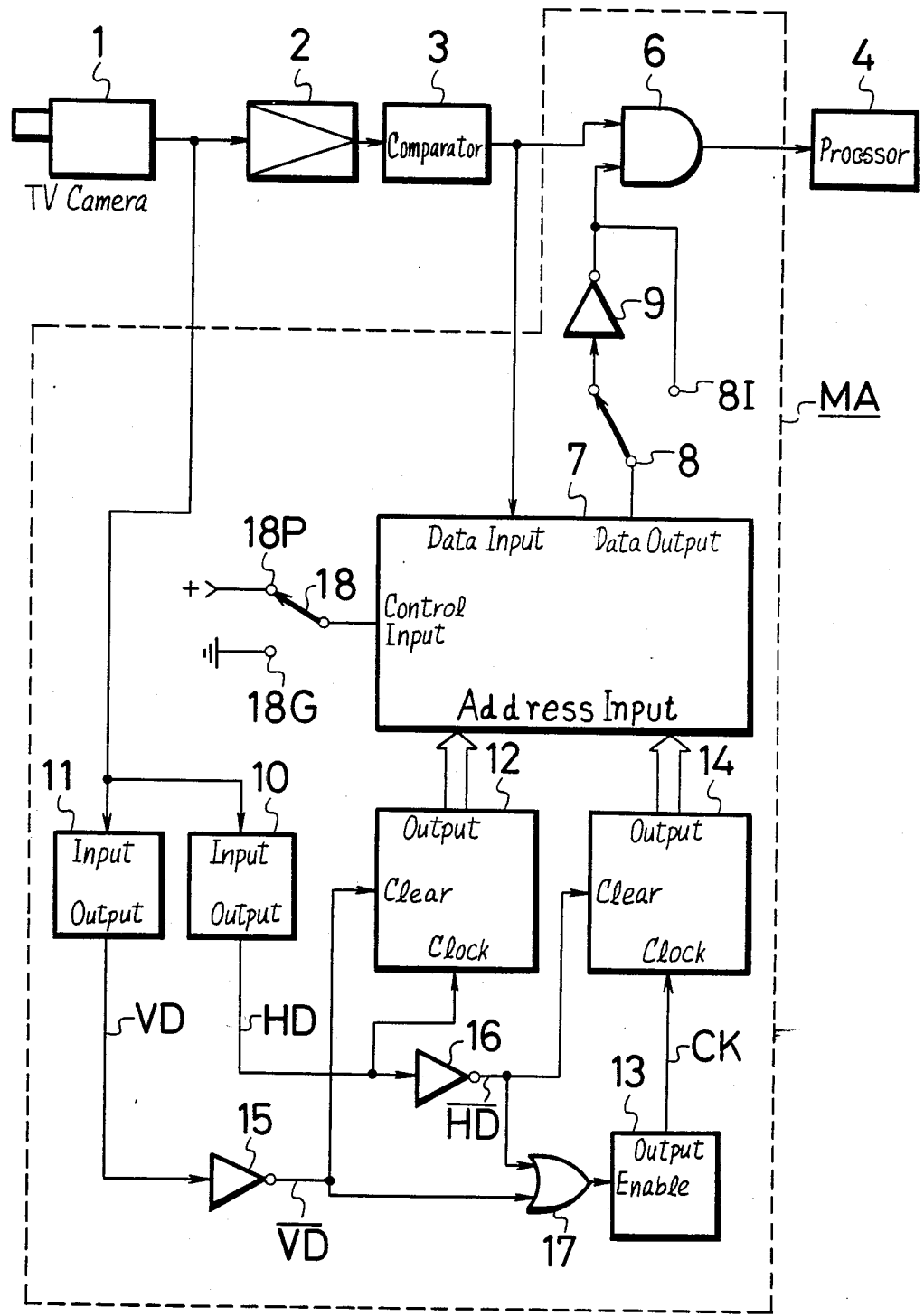
FIG. 3 is a block diagram showing an example of the image data masking apparatus according to the present invention which is applied to the prior art apparatus shown in FIG. 1, by way of example.

Further, when the present invention is applied to the case where, instead of converting the image data signal from the television camera 1 into the binary data signal by comparator 3 as shown in FIG. 1, the data signal may be datarized to the multi value signal by the A/D Converter 5, as shown on FIG. 2, as shown in FIG. 6. Instead, of the AND circuit 6 in the masking apparatus MA as shown on FIG. 3, a bus buffer 19 or the like which can control the data passage may be used. Of course, in such case, to the data input terminal of the memory circuit 7 (not shown in FIG. 6), is as shown in the drawing supplied with an input signal from the output amplifier 2 via the comparator 3. The other construction and functions of the example shown in FIG. 6 are exactly the same as those of the example shown on FIG. 3, so that such illustration as well as explanation will be herewith omitted.

When the horizontal and vertical synchronizing signals are outputted from the television camera separate from the image signal, the separation circuits used in the above example of the invention may be omitted. Further, various circuit changes such as changing the memory capacity of the memory circuit 7 in accordance with the number of the divided picture elements, instead of the AND circuit 6 or bus buffer 19, masking the image data signal as an analog signal and then supplying the same to the processor by the use of an analog switch and so on may be freely made without departing from the main concepts of the present invention.

It is noted that the above mentioned example of the present invention is applied to the case where the target screen 1P of the television camera 1 is formed of a plurality of sensor or picture elements arranged in a matrix pattern. However, the present invention may be applied to a case where a television camera, uses a normal pick-up tube, for example, a clock generator is used to divide the output image data signals from the television camera as aforementioned. It will be apparent that the latter case becomes the same as the case where the television camera which has a plurality of picture elements arranged in a matrix as shown in FIG. 4, is employed.

The above description is given on preferred embodiments of the present invention, but it will be apparent that many modifications and variations could be effected by one skilled in the art without departing from the spirits or scope of the novel concepts of the invention.

I claim as my invention:

1. An image data masking apparatus for use with image data processing apparatus comprising:
   a television camera including a target screen formed of a number of sensor elements arranged in a matrix in horizontal and vertical directions, said sensors being adapted to pick up an object from said television camera and producing an image data signal of said object;
   a processor for processing the image data signal from said television camera;
   a memory circuit having a plurality of memory elements the number of which being equal to the number of said sensor elements and which are arranged in a matrix similar to that of said sensor elements, for storing the image data from said television camera, each of said memory elements having a specific address corresponding to a specific one of said sensors;
   scanning means for scanning the addresses of said memory elements and relaying both the horizontal and vertical synchronizing signals of said television camera in synchronization with the scanning of said sensor elements by said television camera so as to store image data from respective sensor elements on corresponding memory elements;
   means for producing signals, indicative of said sensors from which of said image data from said television camera are to be masked, and for storing said signals in memory elements of said memory circuit at corresponding addresses;
   means for generating a control signal for read out of said memory elements from said memory circuit signals in direct response to the scanning of said target screen to indicate which portion of said image data is to be processed;
   and means for controlling the supply of the image data from the television camera to said processor in response to said control signal.

2. The image data masking apparatus according to claim 1, wherein said scanning means comprises a horizontal synchronizing signal separating circuit for separating a horizontal synchronizing signal from the image data signal applied thereto from said television camera and a first binary counter supplied with the horizontal synchronizing signal thus separated as its clock and producing output signals which are applied to said memory circuit at its higher addresses to designate addresses of said memory elements in the vertical direction.

3. The image data masking apparatus according to claim 2 wherein said scanning means includes a clock generator for producing clock pulses, the number of which is same as the number of said sensor elements in the horizontal direction and a second binary counter supplied with the clock pulses and producing output signals which are applied to said memory circuit at its lower addresses to designate addresses of said memory elements in the horizontal direction.

4. The image data masking apparatus according to 3 wherein said scanning means includes a horizontal synchronizing signal separating circuit for separating a horizontal synchronizing signal from said image data signal and a second inverter for inverting the horizontal synchronizing signal applied thereto from said horizontal synchronizing separating circuit in polarity, an inverted horizontal synchronizing signal being applied to said second binary counter at its clear input terminal.

5. The image data masking apparatus according to claim 4, including an OR gate through which the inverted horizontal and vertical synchronizing signals from said second and first inverters and supplied to said clock generator at its enable input terminal.

6. The image data masking apparatus according to claim 2 wherein said scanning means includes a vertical synchronizing signal separating circuit for separating a vertical synchronizing signal from said image data signal and a first inverter for inverting the vertical synchronizing signal applied thereto from said vertical synchronizing signal separating circuit in polarity, said inverted vertical synchronizing signal being supplied to said first binary counter at its clear input terminal.

7. The image data masking apparatus according to claim 1, herein memorizing means comprises switch means for controlling writing and reading of said memory circuit.

8. The image data masking apparatus according to claim 1, wherein said control signal generating means comprises an inverter for inverting the control signal in polarity.

9. The image data masking apparatus according to claim 1, wherein said supply controlling means is a digital switch.

10. The image data masking apparatus according to claim 1, wherein said supply controlling means is an analog switch.

11. The image data masking apparatus according to claim 1 including a comparator which receives the image data signal from said television camera and converts said image data signal to binary data, said binary data being supplied to said memory circuit.

* * * * *